Dec. 15, 1953 E. R. RINEHART 2,662,531
METAL PLATED SMOKING PIPE
Filed April 6, 1951 2 Sheets-Sheet 1

ELWOOD R. RINEHART
Inventor

By Smith & Tuck
Attorneys

Dec. 15, 1953 E. R. RINEHART 2,662,531
METAL PLATED SMOKING PIPE
Filed April 6, 1951 2 Sheets-Sheet 2
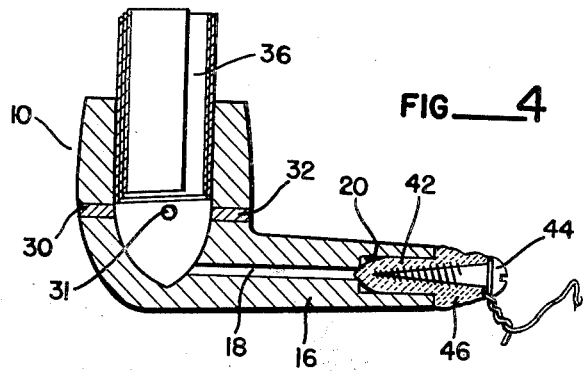
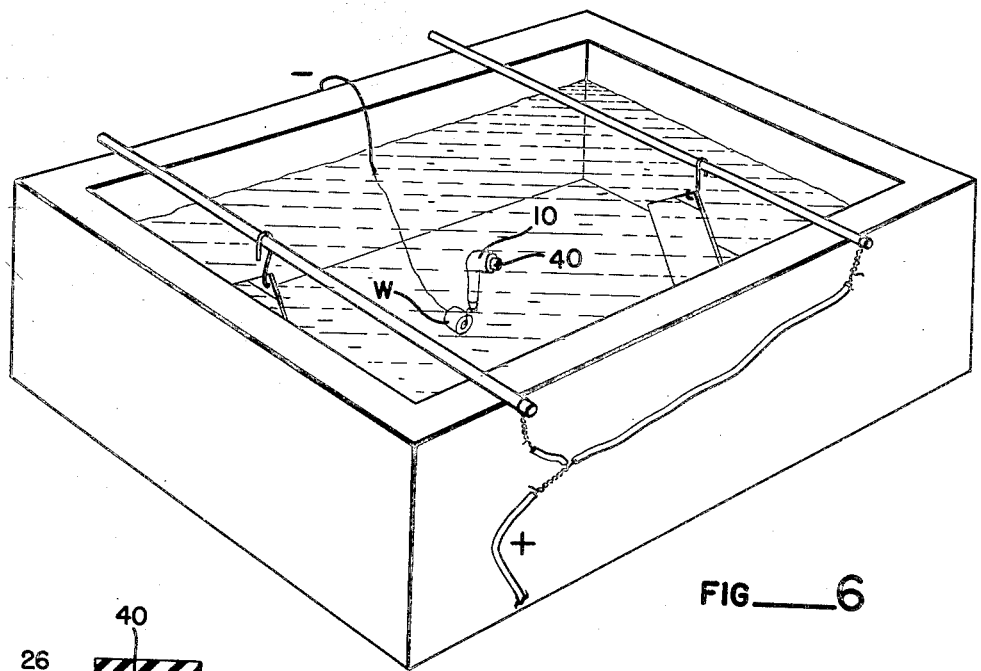
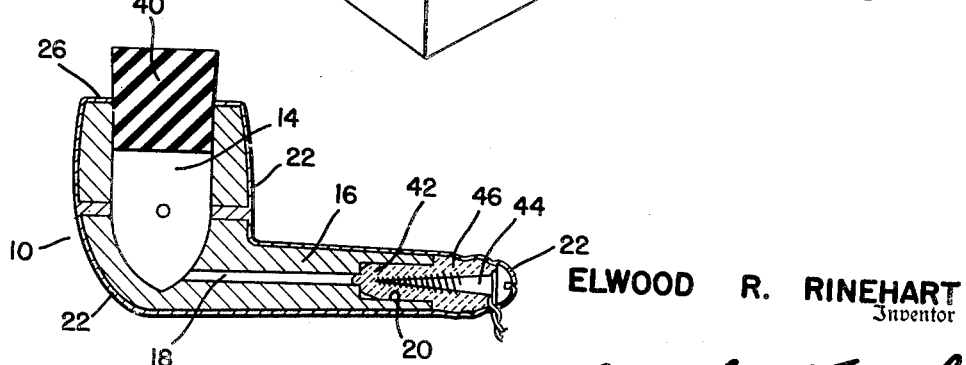
ELWOOD R. RINEHART
Inventor
By Smith & Tuck
Attorneys Patented Dec. 15, 1953

2,662,531

UNITED STATES PATENT OFFICE 2,662,531

METAL PLATED SMOKING PIPE

Elwood R. Rinehart, Seattle, Wash.

Application April 6, 1951, Serial No. 219,689

3 Claims. (Cl. 131—194)

This present invention relates to a smoking pipe in which the wooden bowl portion is electroplated with a heat conductive metal. A method is provided for the plating of wood smoking pipes and further means are provided that extend inwardly to contact the tobacco-consuming chamber of the pipe so that heat is readily conducted out of those points where excess temperatures are usually created and thus a smoking pipe can have a long useful life.

In the past the makers of smoking pipes have recognized the desirable qualities which inhere to a design in which the bowl portion of the pipe is made largely of metal. Of the numerous pipes that have been observed, following these principles, the majority of the pipes are made of aluminum in order to provide a light weight pipe and the tobacco-burning bowl proper is normally an insert of wood, meerschaum or material of like character. Pipes made after such a plan due to manufacturing expediencies are normally of the same form in each pipe quantity produced. This is objectionable to the pipe-loving smokers who usually like a pipe which has a distinct individuality and which is cherished over long periods and becomes in effect a man's personal companion. Quantity produced metal pipes do not fill this need. Those pipes observed made after the principles of a mass or machine metal pipe normally are lacking in smoking qualities. The veteran pipe smoker begins to enjoy his pipe when a considerable mass of the wood or briar has become impregnated with the tars normally given off in the smoking process and when this has occurred the pipe is termed as having been "broken in." To achieve this sense of a "broken in" pipe the bowl proper must be of a good grade of pipe briar and must have sufficient body so the tars can filter out through the pores of the wood and thus avoid the bitterness which is found in some of the plastic pipes, for instance, where little if any penetration can occur. Such pipes must be constantly cleaned and never develop the sweetness so much sought after by the pipe smoker. This present invention contemplates supplying the pipe smoker with his favorite form of briar pipe so that he may have a shape that suits his own desires. Then this pipe of a chosen shape is electroplated preferably with copper as it has high conductivity of heat, and the copper, in turn, if desired can be plated with any of the various metals used for such purposes, particularly as silver and gold. Such a pipe has all the inherent smoking qualities of a good brand of pipe yet due to the plating and other heat conductive means, to be explained in the following specification, the briar is protected against excess temperatures by the expedient of having the excess heat conducted to the surface of the pipe bowl as a whole, where the large surface will permit its radiation into the ambient air. This is all achieved without undue weight of the pipe as the plating process is under complete control and the plating can be deposited in so thin a layer that it weighs but little and further it can be deposited on any of the carved or ornate pipes.

The principal object of this present invention therefore is to provide a smoking pipe in which the bowl and stem portions made integrally with the bowl, may be electroplated with a high heat conductive metal.

A further object of this invention is to provide a method which can be used to electroplate a finished wooden bowl pipe.

A further object of this invention is to provide means whereby a covering of heat conductive metal can be electroplated on the bowl of a wooden pipe wherein the thickness of plating is readily controlled to the end that various configurations of the wood or the imprinted name of the maker of the pipe is not so covered up as to be lost.

A further object of this invention is to provide means extending into the inner surface of a pipe bowl, and physically in contact with the plated coverings, so that heat will be conducted out of the pipe bowl into the outer covering where it may be readily radiated into the ambient air.

Further objects, advantages and capabilities will be apparent from the description and disclosure in the drawings, or may be comprehended or are inherent in the device.

In the drawings:

Figure 4 is a vertical sectional view showing a pipe bowl being prepared for the plating operation;

Figure 5 illustrates in a vertical sectional view a pipe bowl which is completely prepared ready for final plating;

Figure 6 is a perspective view illustrative of the final plating operation.

Figure 1:
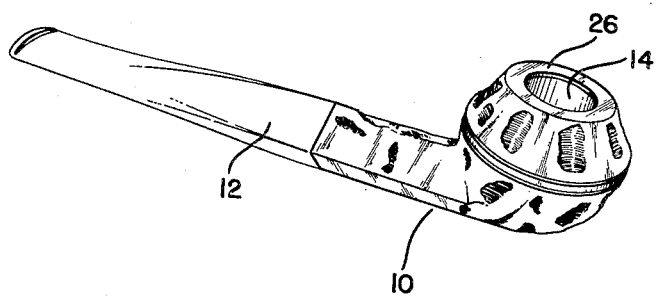
Figure 1 is a perspective view showing a configured briar pipe bowl which has been metal-plated in accordance with the present invention.
Figure 2:
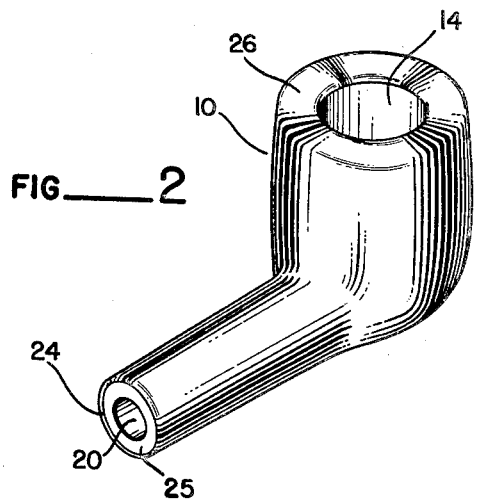
Figure 2 is a perspective view of a different shape of pipe which was originally smoothly finished but which after the plating operation can be highly polished.
Figure 3:
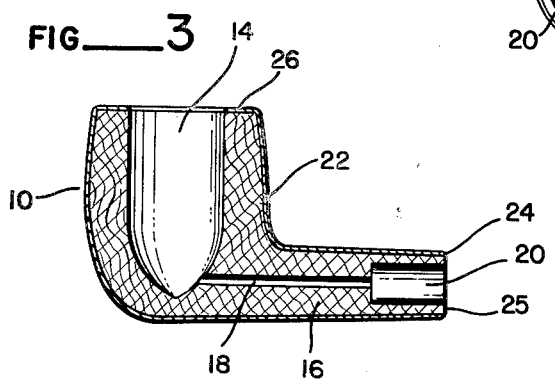
Figure 3 is a typical vertical sectional view through a pipe bowl made after the teachings of this present invention.

Referring more particularly to the disclosure in the drawings, the numeral 10 designates the bowl portion of a smoking pipe which is fitted with some form of stem portion 12. There is a wide variety of pipe forms. This includes the bowl portion 10 and likewise a large number of styles of bit portions 12. No doubt one of the factors that makes the briar pipe so popular with smokers is the wide variety that can be obtained so that each person can have a pipe that is distinctive and fully suits his desires. This present invention relating as it does to heat conductive means and an outer protective covering which serves as a radiating or dissipating surface, can be applied to any of the various pipe forms. In Figure 1 a configured form of pipe bowl has been shown in order to illustrate the fact that any form of carving, configuration or imprinting, can be covered by the electroplated metal covering without losing the distinctive features of the original configuration. The pipe bowl portion is normally provided with a tobacco-receiving cavity 14 and connecting with this cavity near its lower portion is the smoke duct 16 which is normally axially disposed with respect to the bowl stem portion 18. This stem portion is provided at its outer end with a counterbored recess 20 adapted to accept the reduced diameter portion of the bit 12.

This invention relates particularly to the electrically deposited metal sheath 22 which is deposited over the entire surface, normally, of the wooden portion of the pipe consisting of the bowl portion proper 10 and the bowl stem 16. The sheath or covering extends out to the end of the stem portion as indicated at 24 so that a smooth juncture is made with the pipe stem or bit 12. The upper surface of the bowl as indicated at 26 is similarly covered with metal at the time the bowl is covered and being deposited at the same time as a unitary structure with the sheath proper. The rim portion 26 extends to the inner wall of cavity 14 and serves to conduct into the sheath proper the excess heat that may be generated around the margins of the lighted tobacco. It is quite common to find that the initial lighting of a pipe produces a very full hot coal surface, and, unless this heat around the margins is conducted away and radiated into the air, a charring will occur around the upper inside margins of the cavity 14. As applied in this present invention, however, rim 26 serves as the contact element and the heat is conducted into the mass of the sheath where a large radiating area is provided and the excess temperature quickly dissipated in the ambient air.

As a pipe is being smoked, it quite often develops that because of unusual packing of one portion of the tobacco, or some heavy pieces of tobacco, the air current caused by the smoker's suction on the pipe stem will make the fire become more intense on some one point. This many times can raise the temperature of the wood bowl up to the kindling point, or if not of sufficient intensity to cause kindling of the wood, and burning thereof, it very often will cause charring of the wood which from that time on provides a weak spot in the pipe bowl susceptible to attack by excess temperatures in subsequent smoking of the pipe. With the use of the enclosing sheath 22, however, any local heat is distributed through the sheath and quickly radiated into the air, thus lowering the temperature of the pipe and maintaining it at a temperature below that which can cause permanent damage to the pipe. This same protection by the sheath extends to the stem portion 16 which is normally quite vulnerable due to the fact that excess amount of tars tend to collect in the lower portion of the stem and thus reduce the resistance of the briar to excess coloration or burning.

At 30, 31 and 32 I have illustrated metal, preferably copper, inserts. These are of the nature of copper pins or plugs of which there may be any desired number. They normally should be disposed at those points where with a particular shaped pipe bowl, experience has shown that maximum damage to the bowl occurs. These plugs terminate on the surface of the wall of cavity 14 and extend outwardly entirely through the bowl proper, and, when the sheath 22 is deposited on the bowl, a through juncture is made with these plugs so that conductivity through the plugs and into the sheath is definitely assured.

Method of plating

In the process of electrically depositing the metallic sheath on the pipe bowl and stem, the first step is to remove the pipe bit 12. The bowl must then be water-proofed over the entire surface that is going to be exposed to the plating solution. It is to be observed, however, that the tobacco-receiving cavity 14 should be protected against any part of the processing, as normally the entire inner surface of the cavity is treated by the maker of the pipe in one of the various processes to add life to the bowl and to increase its resistance to charring or burning. Initially, to protect the cavity 14 during the waterproofing step in my method, I have found it most convenient to roll up or coil up paper and stick it in the bowl after the showing of Figure 4. The waterproofing material can then be applied to the wood by handbrushing the same on or by preferably airbrush spraying the same. Various forms of waterproofing material may be used—a sprayed-on coat of lacquer is probably the most satisfactory solution. However a thin shellac or wax, or other like suitable substances, may be applied as by handbrushing the same on the wood. When the effective covering has dried, the surface should be lightly sanded. A satisfactory grade for this sandpaper is the 400 wet or dry sandpaper. The paper mask 36 can now be removed and the bowl is ready for the next step.

It is to be understood that in order to electroplate, the object to be plated normally is the anode of a galvanic bath, and, in order to obtain uniform plating throughout, the surface must be treated to make it electroconductive.

Chemical electroplating requires that the unit to be plated be entirely immersed in the solution. Consequently it is necessary to seal both the tobacco cavity 14 and the bore 20 of the stem so that no fluid can enter the same, and further, it has been found most practical to seal these elements before the protective coating is applied and thus reduce to a minimum the handling of this pipe between the coating and the immersion. The sealing of cavity 14 is probably best achieved by the use of a tight-fitting rubber stopper 40 after the showing of Figure 5. The stem cavity 20 is then filled with wax as illustrated at 42 in Figure 4 and into this wax is placed a bolt, or preferably wood screw 44. The head of the screw should extend out far enough so that a wax projection 46 is provided. The wax should fully cover the extreme end 25 of stem 16 and be of a diameter reduced by tapering after the showing of Figures 4 and 5. When this tapering wax surface is covered with the electroconductive material it acts as a current robber to prevent nodulation and excessive build-up of electrodeposits on the critical outside diameter of the pipe bowl stem 16 so that in the finished work the stem will be continuous with the contour of the bit portion 12. The conductive coating may be made of various material such as forming a coating of precipitate silver or other metals by chemical induction of metallic salt solutions which may be sprayed on or obtained by submersion of the bowl in the solution; or the surface may be coated with a conductive paint which may be either sprayed or brushed on; or by producing a thin coating of metal by breaking down a metallic substance by electric action, or the organic waterproofing material may be impregnated with silver nitrate, and, upon exposing the surface to hydrogen sulphide fumes, silver sulphide is formed which is an excellent conductive material. With any of the foregoing means of applying the conductive coating, it is necessary that a good homogeneous conductive coating be obtained and if inspection discloses that the coating is not perfect, the operation should be repeated.

The negative electric supply wire is now connected to screw 44 and the bowl which forms the cathode is submerged in the electroplating bath. One convenient way of assuring submergence of the bowl is by use of the weight W applied to the conductor after the showing of Figure 6. With the pipe bowl in the copper electroplating bath, electroplate copper will begin to form on the outside of the bowl and the operation can be continued until the desired thickness has been obtained.

A suitable electroplating bath for this purpose may consist of:

Copper sulphate, 27 oz. per gal.
Sulphuric acid, 6½ oz. per gal.
Iron-free molasses should be added as an additional agent on a proportion of 1 pint to 100 gals. of electrolyte.

This will produce a smooth homogeneous electric deposit without treeing. Conditions of bath:

Temperature, 75 degrees to 100 degrees F.
Current density, 15 to 40 amperes per sq. ft.
Voltage, .75 to 2 volts.
Anodes to be rolled annealed copper.

After the desired thickness of plating is reached, remove the pipe bowl from the plating bath and rinse in warm water at approximately 130 degrees Fahrenheit and dry with a cloth or compressed air. The rubber stopper should then be removed from the bowl with a twisting motion. This is particularly desirable in case the plating is relatively thin, as to pull the stopper out with a straight movement might cause the edges of the overhanging rim 26 to be torn. The excess core or stem of copper extending past the original bowl stem should be cut with a copper pipe cutter and the ragged edges should be dressed down with a file, flush with the front of the stem. The copper surface should then be polished with an emery grease wheel operated at medium speed. After the greased emery wheel polish, the pipe is to be buffed to a high luster with a soft buff and metal polishing compound then a heat resistant lacquer may be brushed or sprayed upon the polished surface to prevent the copper from tarnishing. The final step is to remove the wax plug from the stem of the pipe and insert the bit and the pipe is ready for use.

If it is desirable, the copper, which forms a very excellent base for any other metal deposits, may be covered with other decorative metals such as nickel, silver, or gold by electroplating over the freshly buffed copper. In that case the copper must be a chemically clean surface.

It is believed that it will be clearly apparent from the above description and the disclosure in the drawings that the invention comprehends a novel construction of metal plated smoking pipes.

Having thus disclosed the invention, I claim:

1. A smoking pipe, comprising: a self-supporting wooden bowl and stem; a metal coating on said bowl and stem; said coating having a substantially uniform thickness and being very thin, whereby said coating follows the configuration of said bowl and stem and presents an outer surface with substantially the same configuration; said coating entirely covering said stem to its edge abutting the bit; said coating entirely covering said bowl including the upper surface to the edge of the fire chamber; whereby heat, reaching the outer surface of said wooden bowl and stem at any point, will be dissipated by conduction to other portions of said metal coating; and whereby temperatures, in the upper portion of said fire chamber, will be lessened by conduction from the upper surface coating of said bowl to other portions of said coating; a plurality of metal pin-like inserts, each extending from the portion of said fire chamber of maximum temperatures to the adjacent portion of said metal coating, whereby temperatures in said portion of said fire chamber of maximum temperatures will be lessened by conduction through each metal insert to said adjacent portion of said metal coating.

2. A smoking pipe, comprising: a self-supporting wooden bowl; a metal coating on said bowl; said coating having a substantially uniform thickness and being very thin, whereby said coating follows the configuration of said bowl and presents an outer surface with substantially the same configuration; a plurality of metal pin-like inserts, each extending from the portion of the fire chamber of maximum temperatures to the adjacent portion of said metal coating; whereby heat, reaching the outer surface of said bowl at any point, will be dissipated by conduction to other portions of said metal coating; and whereby temperatures in said portion of said fire chamber of maximum temperatures will be lessened by conduction through each metal insert to said adjacent portion of said metal coating and thence conducted to other portions of said metal coating.

3. A smoking pipe, comprising: a self-supporting wooden bowl; a metal coating on said bowl, said coating having a substantially uniform thickness and being very thin and following the configuration of the bowl and presenting an outer surface with substantially the same configuration; a plurality of metal pin-like inserts, each extending from the portion of the fire chamber of maximum temperatures to the adjacent portion of said metal coating, whereby temperatures in said portion of said fire chamber of maximum temperatures will be lessened by conduction through each metal insert to said adjacent portion of said metal coating and thence conducted to other portions of said metal coating.

ELWOOD R. RINEHART.

References Cited in the file of this patent

UNITED STATES PATENTS

| Number | Name | Date |
|---|---|---|
| 611,575 | Gill | Sept. 27, 1898 |
| 1,462,277 | Graveure | July 17, 1923 |
| 1,862,443 | Tuggle | June 7, 1932 |
| 1,879,433 | Norton | Sept. 27, 1932 |
| 1,871,365 | Griswold | Aug. 9, 1932 |
| 2,581,169 | Bugg | Jan. 1, 1952 |

FOREIGN PATENTS

| Number | Country | Date |
|---|---|---|
| 203,919 | Great Britain | Sept. 20, 1923 |
| 207,024 | Great Britain | Nov. 22, 1923 |
| 549,235 | France | Nov. 14, 1922 |